(12) United States Patent
Dragic

(10) Patent No.: US 7,079,749 B2
(45) Date of Patent: Jul. 18, 2006

(54) WAVEGUIDE CONFIGURATION

(76) Inventor: Peter Dragic, 4631 N. Malden #2N, Chicago, IL (US) 60640

( * ) Notice: Subject to any disclaimer, the term of this patent is extended or adjusted under 35 U.S.C. 154(b) by 78 days.

(21) Appl. No.: 10/766,289

(22) Filed: Jan. 27, 2004

(65) Prior Publication Data

US 2005/0013569 A1    Jan. 20, 2005

Related U.S. Application Data

(60) Provisional application No. 60/442,843, filed on Jan. 27, 2003.

(51) Int. Cl.
*G02B 6/00* (2006.01)
*G02B 6/02* (2006.01)

(52) U.S. Cl. ............ 385/142; 385/126; 385/141; 385/144

(58) Field of Classification Search ............ 385/126, 385/141, 142, 144
See application file for complete search history.

(56) References Cited

U.S. PATENT DOCUMENTS

| | | | | |
|---|---|---|---|---|
| 4,913,521 A | * | 4/1990 | Tajima et al. ............. | 385/126 |
| 5,170,457 A | * | 12/1992 | Jen ............................ | 385/123 |
| 6,535,665 B1 | * | 3/2003 | Kim et al. ................. | 385/28 |
| 6,542,683 B1 | * | 4/2003 | Evans et al. .............. | 385/127 |
| 6,587,623 B1 | | 7/2003 | Papen et al. .............. | 385/123 |
| 6,754,423 B1 | * | 6/2004 | Simons et al. ........... | 385/126 |
| 6,829,422 B1 | * | 12/2004 | Berkey et al. ............ | 385/126 |
| 2002/0118935 A1 | * | 8/2002 | Balestra et al. .......... | 385/123 |
| 2005/0135760 A1 | * | 6/2005 | Bickham ................... | 385/124 |

FOREIGN PATENT DOCUMENTS

| | | | |
|---|---|---|---|
| JP | 01129207 | * | 11/1987 |
| JP | 09218319 | * | 2/1996 |

* cited by examiner

*Primary Examiner*—Brian Healy
*Assistant Examiner*—Charlie Peng
(74) *Attorney, Agent, or Firm*—The Watson IP Group, PLC.; Jovan N. Jovanovic; Vladan M. Vasiljevic

(57) ABSTRACT

A waveguide configuration comprising a core, a first cladding, a second cladding and a buffer. The core includes an index of refraction and a shear velocity. The first cladding extends about the core, has a shear velocity that is less than that of the core and has an index of refraction which is less than the core. A second cladding extends about the first cladding and has a shear velocity which is greater than that of the first cladding. An optical mode of the waveguide configuration has an index of refraction greater than that of the second cladding. The buffer extends about the second cladding. The core comprises one of a rare-earth dopant and an undoped glass fiber. The first cladding is selected from the group consisting of: Boron doped glass fiber, Fluorine doped glass fiber, and, Boron and Fluorine doped glass fiber. The second cladding has a higher relative doping concentration of Boron, Fluorine, or Boron and Fluorine than the first cladding and also contains Aluminum.

6 Claims, 3 Drawing Sheets

WAVEGUIDE CONFIGURATION

CROSS-REFERENCE TO RELATED APPLICATION

This application claims priority from U.S. Provisional Patent Application Ser. No. 60/442,843 filed Jan. 27, 2003, the disclosure of which is incorporated by reference in its entirety.

BACKGROUND OF THE INVENTION

1. Field of the Invention

The present invention relates in general to waveguides, and more particularly, to a waveguide comprising a particular construction so as to suppress the SBS effect.

2. Background Art

The use of waveguides in various industries such as telecommunications and lasers, among others, has been steadily increasing. While the ability to send optical signals through waveguides is well known in the art, certain phenomena have been observed. In particular, one effect that has been observed is the Stimulated Brillouin Scattering (SBS) effect. SBS is an important example of a stimulated scattering process; light scattering which occurs when the intensity of the light field itself affects the propagating medium. This phenomenon has become relevant in the optical fiber industry, due to the increasing intensity required in optical fiber cores and the relatively long interaction lengths. SBS is one of the major limiting factors on the amount of power that can be transmitted via an optical fiber.

Certain prior art references have attempted to suppress the SBS effect through the use of waveguides which have particular constructions. While some of the solutions have suppressed the SBS effect to some extent, many of these waveguides have constructions which are difficult to manufacture on a large scale, or which are economically not feasible.

Accordingly, it is an object of the invention to overcome the deficiencies in the prior art. For example, it is an object of the present invention to provide a waveguide construction which is both economical to manufacture and feasible to manufacture which suppresses the SBS effect.

These objects as well as other objects of the present invention will become apparent in light of the present specification, claims, and drawings.

SUMMARY OF THE INVENTION

The invention comprises a waveguide configuration. The waveguide configuration comprises a core, a first cladding, a second cladding and a buffer. The core includes an index of refraction and a shear velocity. The first cladding extends about the core, has a shear velocity which is less than that of the core and an index of refraction which is less than the core. The second cladding extends about the first cladding. The second cladding has a shear velocity which is greater than that of the first cladding. The optical mode of the waveguide configuration has an index of refraction greater than that of the second cladding. The buffer extends about the second cladding. The core is selected from the group consisting of: Aluminum doped glass fiber, Aluminum and Phosphorus doped glass fiber, and, Aluminum and Germanium doped glass fiber, and, Aluminum and both Germanium and Phosphorus. Of course, inasmuch as Aluminum raises acoustic velocity and index and P and Ge lower the acoustic velocity and index, it will be understood that relative concentrations must be selected to retain acoustic velocity profile described herein. It will be understood that certain fiber manufacturers utilize P or Ge in combination with Al to produce an acceptable fiber. In addition, in certain embodiments, the core may contain rare-earth dopants such as Erbium, Ytterbium, or Neodymium to make them suitable for fiber laser applications. The first cladding is selected from the group consisting of: Germanium and/or Phosphorus doped glass fiber, Germanium and/or Phosphorus and Boron doped glass fiber, Germanium and/or Phosphorus and Fluorine doped glass fiber, Germanium and/or Phosphorus, Boron and Fluorine doped glass fiber, Boron and/or Fluorine doped glass fiber. Any one of B and F in association with P and Ge are acceptable for use to create the acoustic waveguide defined by the first cladding. However, the relative concentrations in laser fiber must give the index of the first cladding is greater than or equal to the second cladding. This is not critical in a fiber utilized in telecommunications. In certain embodiments phosphorus may be substituted for or used in conjunction with Germanium. The second cladding is selected from the group consisting of: undoped glass fiber. Of course, any combination of the above-identified dopants can be utilized produce a second cladding with an acoustic velocity that is greater than that of the first cladding and retains the optical properties of the fiber.

In one embodiment, the cross-sectional configuration of each of the core, the first cladding and the second cladding are substantially uniform.

In another embodiment, the core is left undoped, the first cladding is comprised of Boron and/or Fluorine. The second cladding layer is comprised of an increased concentration of Boron and/or Fluorine and contains Aluminum. It is to be understood that these are required dopants and it may be obvious to those skilled in the art that trace amounts of other dopants can be incorporated in addition to these and not substantially alter the scope of the invention.

Preferably, the waveguide configuration further comprises a third cladding positioned between the second cladding and the buffer. The third cladding has an index of refraction less than each of the core, first cladding and second cladding.

BRIEF DESCRIPTION OF THE DRAWINGS

The invention will now be described with reference to the drawings wherein.

DETAILED DESCRIPTION OF THE INVENTION

Figure 1:
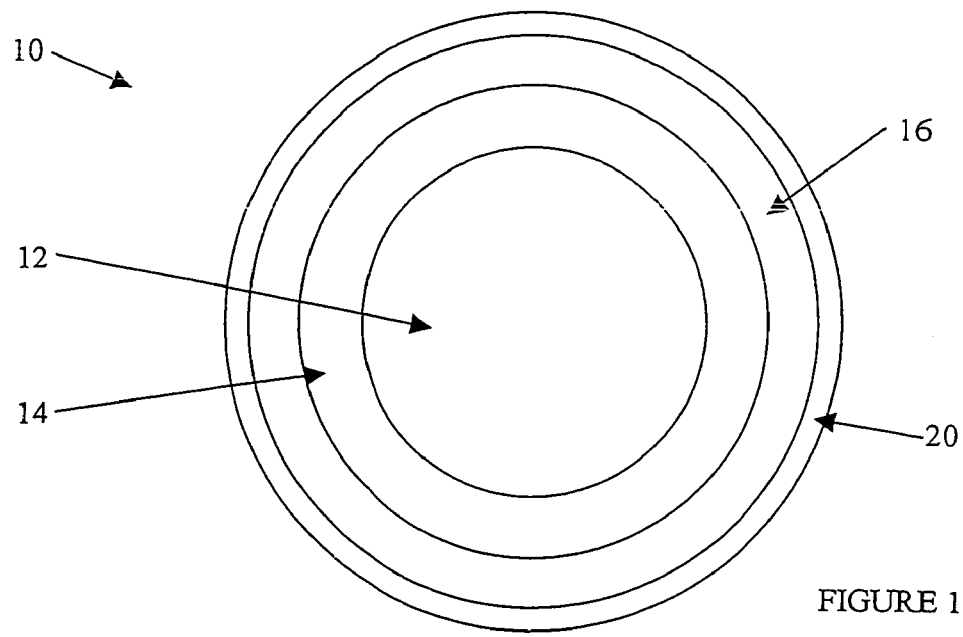
FIG. 1 of the drawings is a cross-sectional representation of a first waveguide configuration of the present invention.

While this invention is susceptible of embodiment in many different forms, there is shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 2:
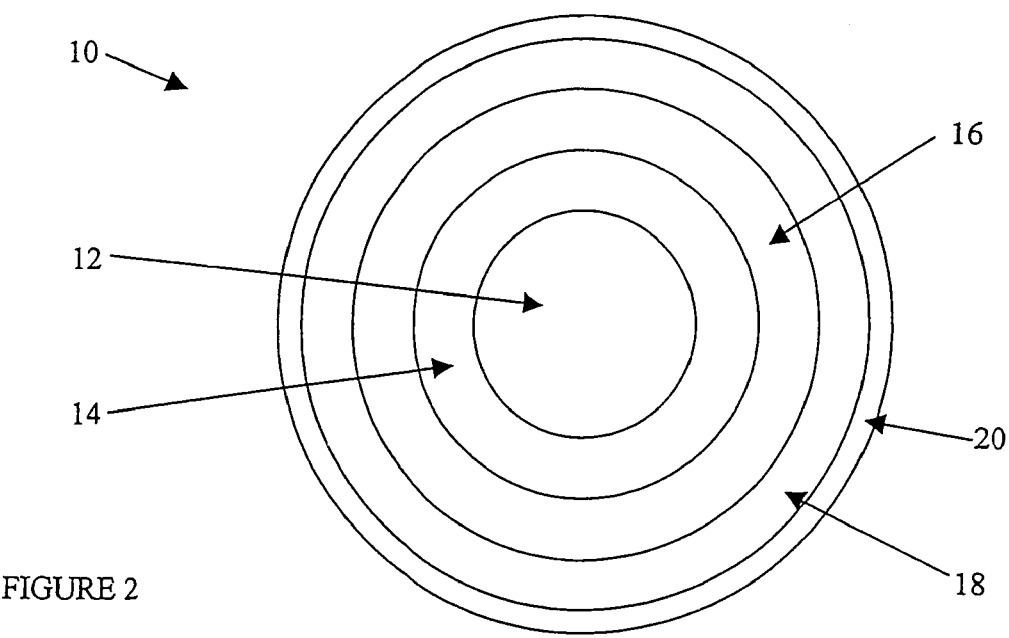
FIG. 2 of the drawings is a cross-sectional representation of a second waveguide configuration of the present invention.

Referring now to the drawings and in particular to FIG. 1, a waveguide configuration made in accordance with the present invention is shown generally as 10. Waveguide 10 includes core 12, a first cladding 14, a second cladding 16 and a buffer 20. In some applications, there may be a third cladding 18 as illustrated in FIG. 2. While the various layers are shown to have substantially uniform thicknesses, it will be understood that the particular thickness of any layer can be varied within the scope of the present invention. In addition, it is contemplated that the waveguide may comprise a substantially uniform cross-section along the length thereof. Among other cross-sectional configurations, circular cross-sectional configurations, are contemplated, as are oval shaped cores or cladding (i.e., for use with optical fibers that preserve polarization).

Core 12 is shown in FIG. 1 as comprising a first material having an index of refraction $n_{core}$ and a certain shear velocity $v_{core}$. By way of example, the core may comprise an Aluminum doped glass fiber. Such a fiber may additionally be doped with Phosphorus and/or Germanium (i.e., in addition to the Aluminum). Another embodiment may include the doping of rare-earth ions such as Erbium, Ytterbium, or Neodymium in the core for fiber laser applications.

First cladding 14 extends around the core and is defined by an index of refraction $n_{clad1}$ and a certain shear velocity $v_{clad1}$. The shear velocity of the first cladding is less than that of the core (i.e., $v_{clad1} < v_{core}$). Similarly, the index of refraction of the first cladding is less than that of the core (i.e., $n_{core} > n_{clad1}$). In the contemplated embodiment, the first cladding comprises a glass fiber doped with Germanium and/or Phosphorus and possibly at least one of Boron and Fluorine to lower the index of refraction if necessary. Alternatively, the first cladding comprises a glass fiber doped with Boron and/or Fluorine.

Second cladding 16 extends around the first cladding and is defined by an index of refraction $n_{clad2}$ and a shear velocity $v_{clad2}$. The shear velocity of the second cladding is greater than the shear velocity of the first cladding. In certain embodiments, the overall optical mode has an index of refraction greater than that that of the second cladding. In the contemplated embodiment, the second cladding may comprise an undoped glass fiber. Of course, it is contemplated that one of skill in the art will understand that any other combination of described dopants that produces a second cladding with an acoustic velocity that is greater than that of the first cladding and retains the optical properties of the fiber may be utilized.

Buffer 20 extends around the second cladding and, as will be understood by those of skill in the art, imparts tensile strength and a certain flexibility to the fiber. Typical buffers of the type commonly used in connection with waveguides are contemplated for use.

In another embodiment, core 12 may be left undoped, the first cladding 14 may include Boron and/or Fluorine. The second cladding layer 16 includes an increased concentration of Boron and/or Fluorine and includes Aluminum. It will be understood that in addition to these dopants trace amounts of other dopants can be incorporated in addition to these and not substantially alter the scope of the invention.

In certain applications, such as telecommunications, the above-described fiber is suitable for use. However, and as is shown in the embodiment of FIG. 2, in association with lasers, an additional, third cladding 18 is positioned between second cladding 16 and buffer 20. Third cladding 18 includes an index of refraction $n_{clad3}$ which is less than the index of refraction of first cladding 14, second cladding 16 and core 12. In the contemplated embodiment, the third cladding comprises a combination of dopants that provides an index of refraction less than all other layers, such as Boron and/or Fluorine. In some cases, the buffer and third-cladding layer may be replaced by a low-index polymer material. However, the relative concentrations in laser fiber must give the index of the first cladding 14 is greater than or equal to the second cladding 16.

Figure 3:
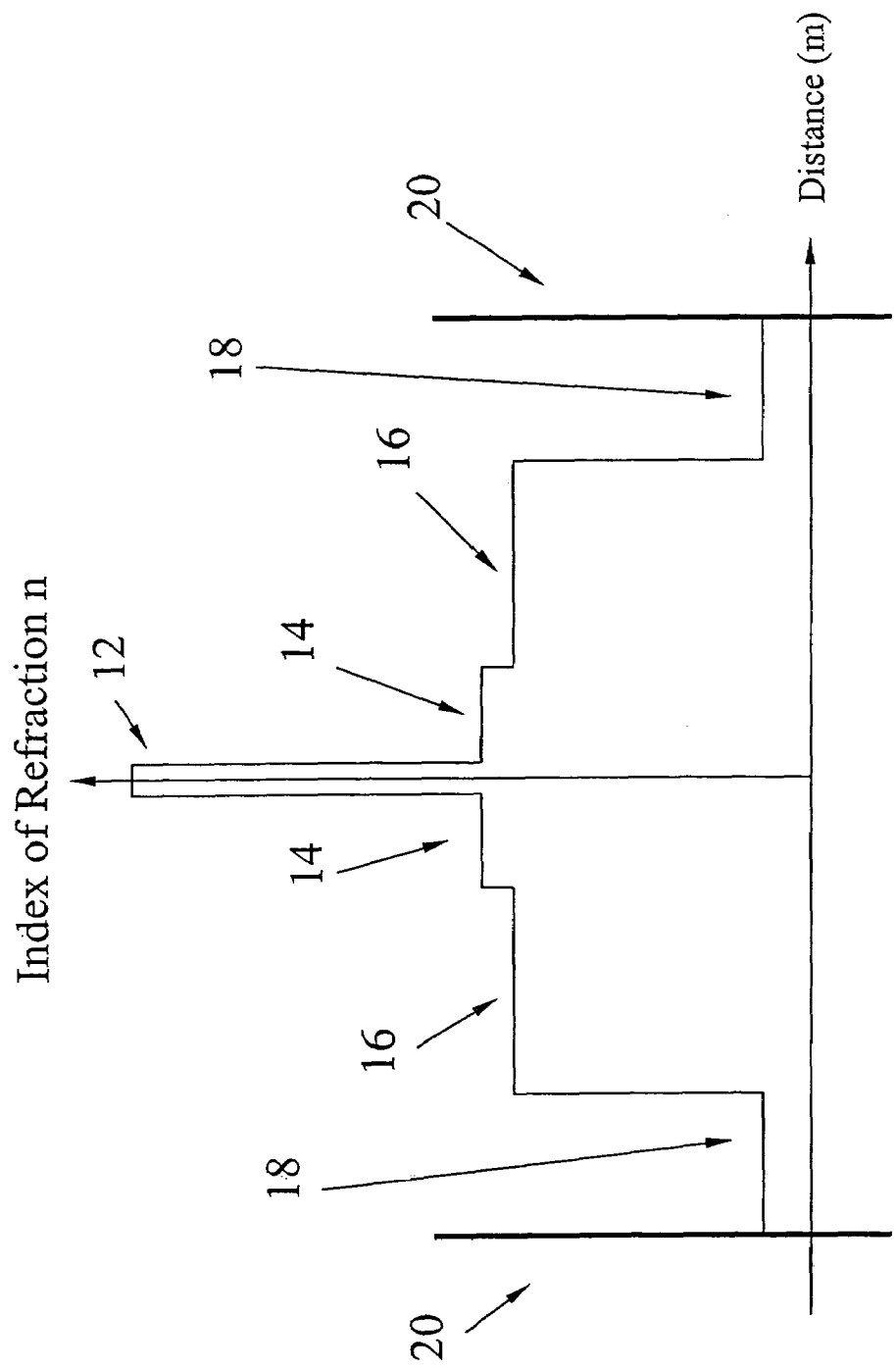
FIG. 3 of the drawings is a cross-sectional profile of the index of refraction of the waveguide configuration of the present invention shown in FIG. 2.
Figure 4:
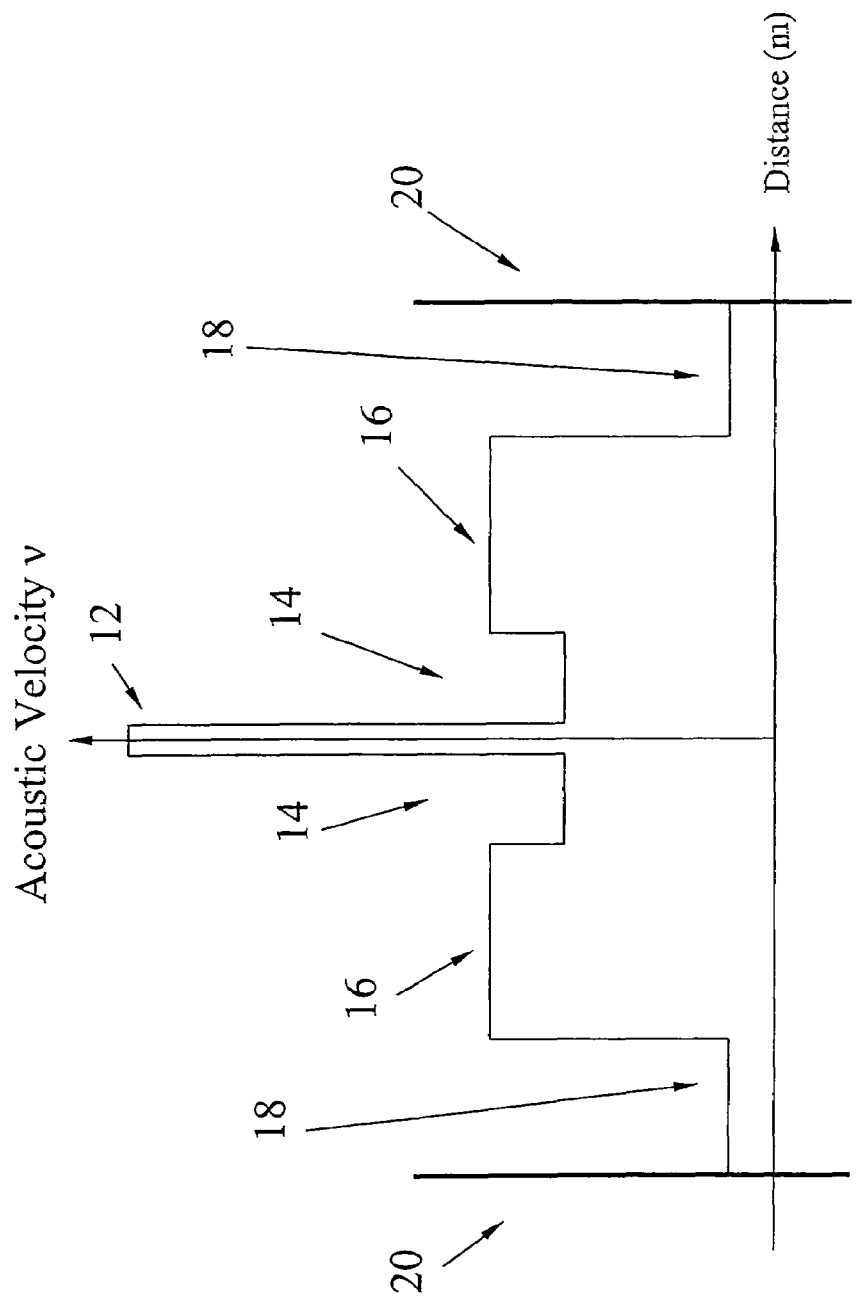
FIG. 4 of the drawings is a cross-sectional profile of the acoustic velocity of the waveguide configuration of the present invention shown in FIG. 2.

FIG. 3 of the drawings is a cross-sectional profile of the index of refraction of the waveguide configuration of the present invention shown in FIG. 2. Similarly, FIG. 4 of the drawings is a cross-sectional profile of the acoustic velocity of the waveguide configuration of the present invention shown in FIG. 2. It will be understood that the waveguide configuration of FIG. 1 has a similar cross-sectional profile relative to the acoustic velocity and the index of refraction, without cladding 18.

It will also be understood that all of the glass layers may have an equivalent background dopant and subsequent dopant concentration that will not affect the basic operation of the device. For example, all of the glass layers may be doped with the same amount of background Phosphorus without departing from the scope of the invention.

In operation, acoustic waves are constantly radiating from the core, whether the core is acoustically guiding or not. This is the fundamental difference between the optical and acoustic modes and is a result of the fact that the glass is a compressible fluid. The boundary between the first and second cladding results in a phenomenon substantially analogous to the total internal reflection of optical waves in the core. Thus, the first cladding substantially captures these waves, resulting in acoustic guidance. These waves are then re-transmitted into the core, interfering with the acoustic waves involved in the SBS process. This may also result in increased acoustic mode coupling into the first cladding layer. These processes then give rise to a degraded overlap between the optical and acoustic fields, leading to an increase in the threshold intensity for the onset of SBS.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A waveguide configuration comprising:
   a core having an index of refraction and a shear velocity;
   a first cladding extending about the core having a shear velocity which is less than that of the core and an index of refraction which is less than the core;
   a second cladding extending about the first cladding, the second cladding having a shear velocity which is greater than that of the first cladding, wherein an optical mode has an effective index of refraction greater than that of the second cladding; and
   a buffer extending about the second cladding,
   wherein, the core is selected from the group consisting of:
   Aluminum doped glass fiber, Aluminum and Phosphorus doped glass fiber, and, Aluminum and Germanium doped glass fiber, and Aluminum and both Germanium and Phosphorus, wherein the first cladding is selected from the group consisting of: Germanium doped glass fiber, Germanium and Boron doped glass fiber, Germanium and Fluorine doped glass fiber, Germanium, Boron and Fluorine doped glass fiber, Boron doped glass fiber and Fluorine doped glass fiber, or Boron and Fluorine doped glass fiber, or the foregoing combinations wherein phosphorus may be substituted for or used in conjunction with Germanium; and wherein the second cladding is selected from the group consisting of: undoped glass fiber.

2. The waveguide configuration of claim 1, wherein the cross-sectional configuration of each of the core, the first cladding and the second cladding are substantially uniform along the length thereof.

3. The waveguide configuration of claim 1 further comprising a third cladding positioned between the second cladding and the buffer, the third cladding having an index of refraction less than each of the core, first cladding and second cladding.

4. A waveguide configuration comprising:

a core having an index of refraction and a shear velocity;

a first cladding extending about the core having a shear velocity which is less than that of the core and an index of refraction which is less than the core;

a second cladding extending about the first cladding, the second cladding having a shear velocity which is greater than that of the first cladding, wherein an optical mode has an effective index of refraction greater than that of the second cladding; and a buffer extending about the second cladding, wherein the core comprises one of a rare-earth dopant and an undoped glass fiber, wherein the first cladding is selected from the group consisting of: Boron doped glass fiber, Fluorine doped glass fiber, and, Boron and Fluorine doped glass fiber, and wherein the second cladding has a higher relative doping concentration of Boron, Fluorine, or Boron and Fluorine than the first cladding and also contains Aluminum.

5. The waveguide configuration of claim 4 wherein the rare-earth dopant comprises one or more of the group consisting of Erbium, Ytterbium, or Neodymium.

6. The waveguide configuration of claim 4 further comprising a third cladding positioned between the second cladding and the buffer, the third cladding having an index of refraction less than each of the core, first cladding and second cladding.

* * * * *